Figure 1:
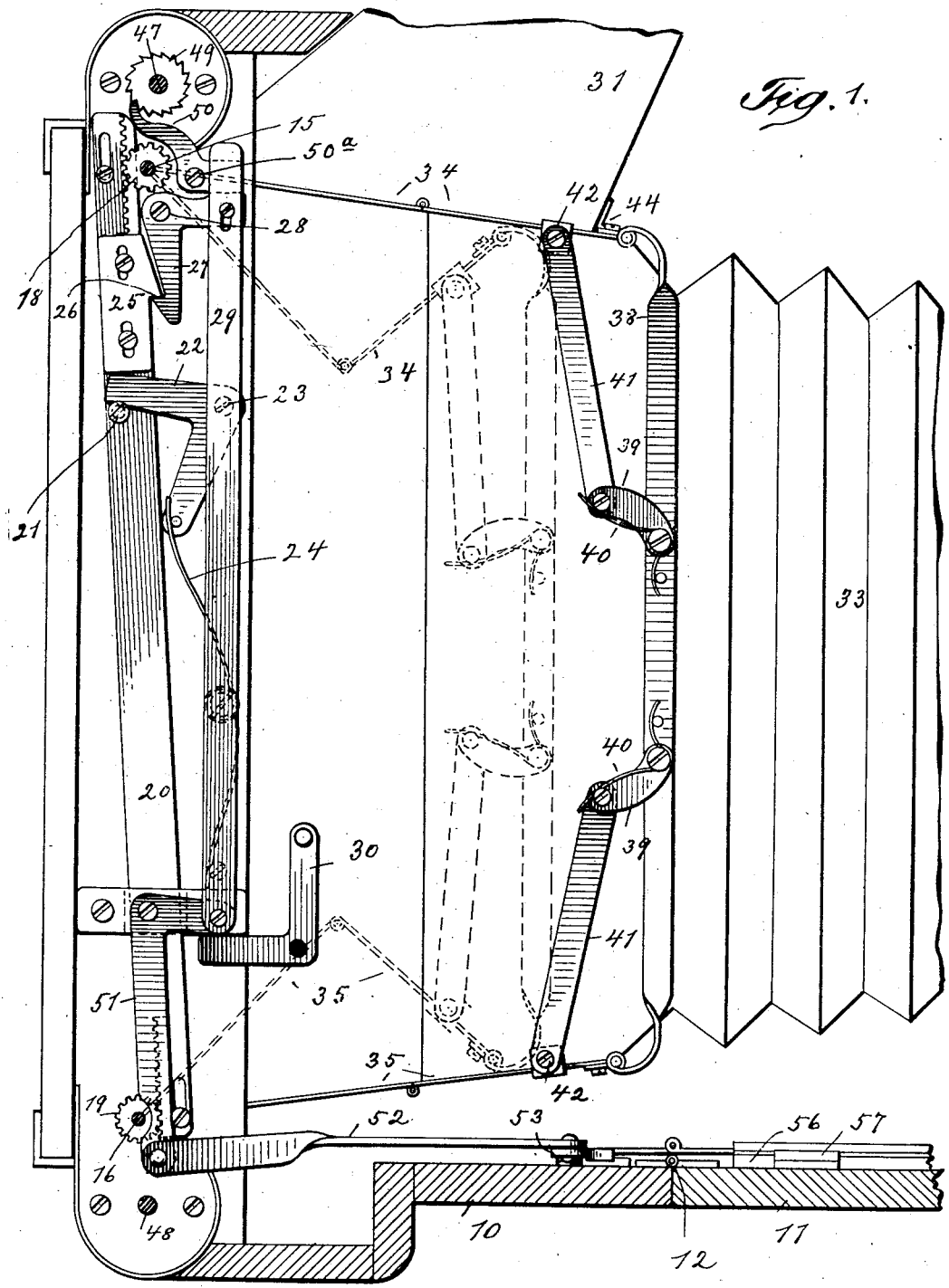

L. BREUNIG.
PHOTOGRAPHIC CAMERA.
APPLICATION FILED MAR. 24, 1914.

1,113,748.

Patented Oct. 13, 1914.
3 SHEETS—SHEET 1.

Witnesses:
Madeline Hirsch

Inventor
Louis Breunig
By his Attorneys

L. BREUNIG.
PHOTOGRAPHIC CAMERA.
APPLICATION FILED MAR. 24, 1914.
1,113,748.
Patented Oct. 13, 1914.
3 SHEETS—SHEET 2.
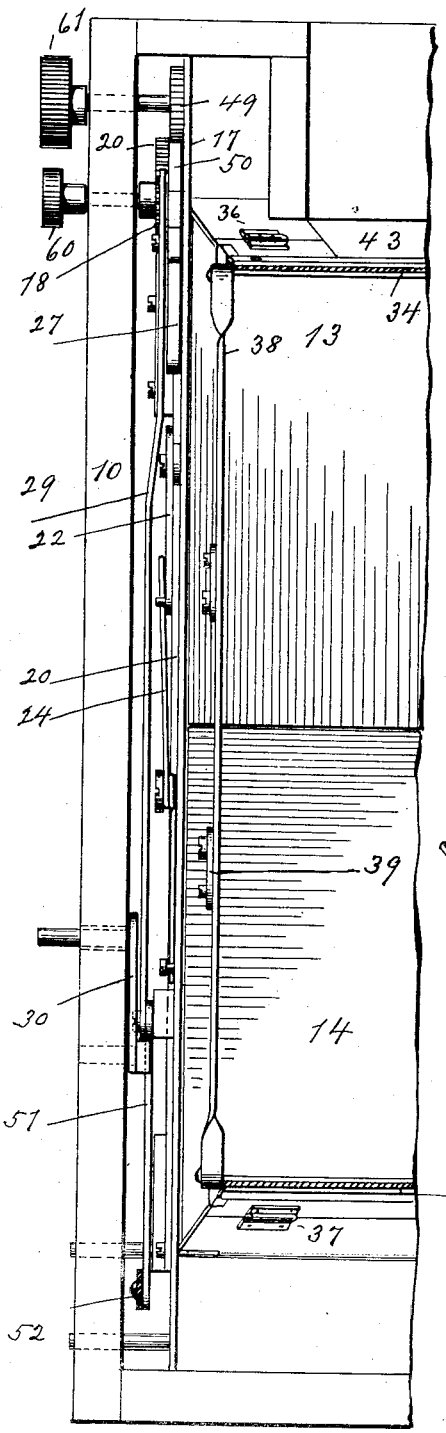
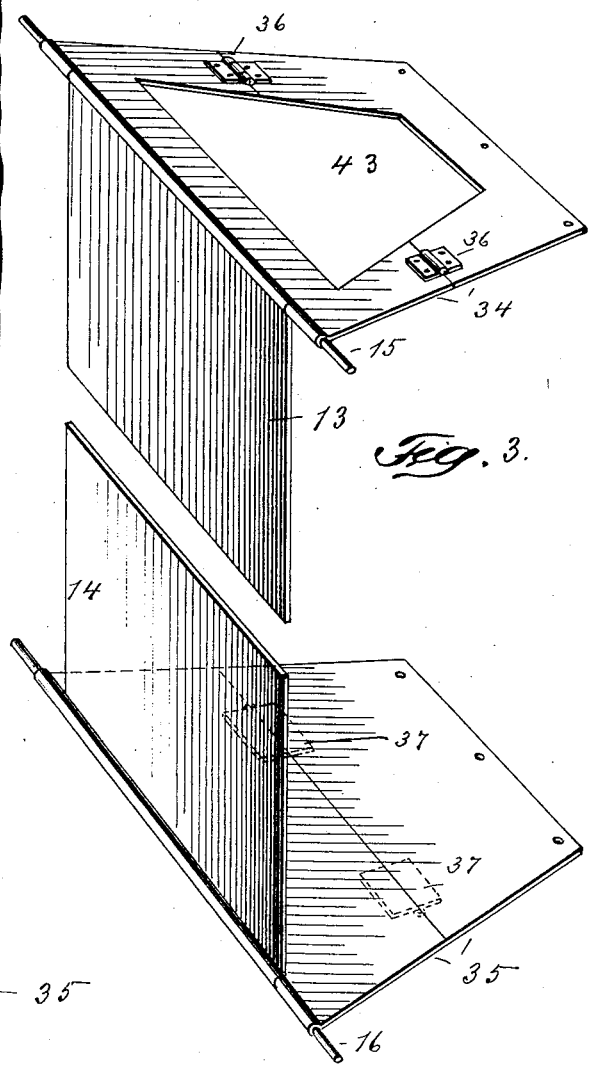
Witnesses:
Inventor
Louis Breunig.
By his Attorneys

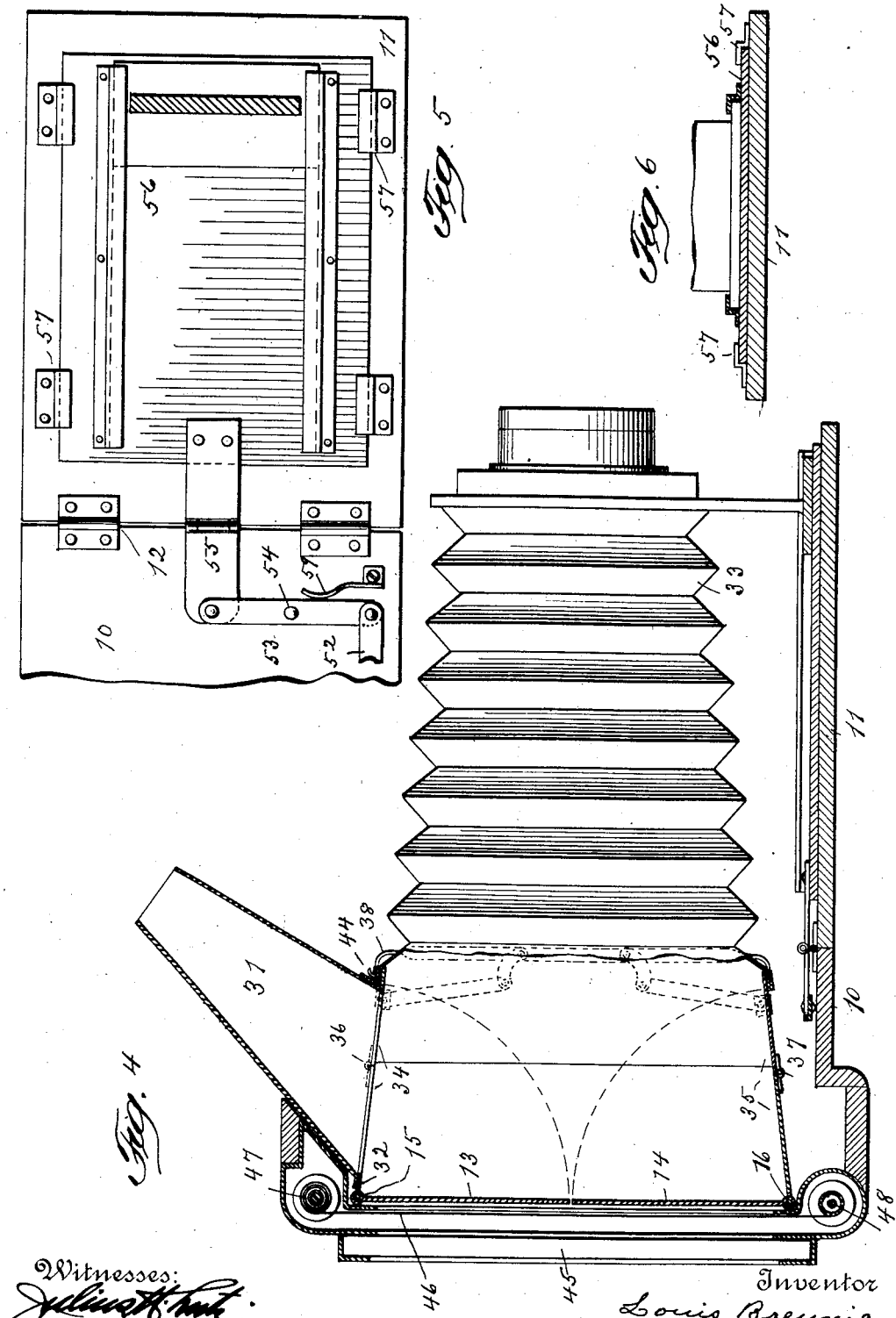

UNITED STATES PATENT OFFICE.

LOUIS BREUNIG, OF NEW YORK, N. Y.

PHOTOGRAPHIC CAMERA.

1,113,748. Specification of Letters Patent. Patented Oct. 13, 1914.

Application filed March 24, 1914. Serial No. 826,874.

*To all whom it may concern:*

Be it known that I, LOUIS BREUNIG, a citizen of the United States, residing at New York city, county of Bronx, and State of New York, have invented a new and useful Improved Photographic Camera, of which the following is a specification.

This invention relates to a camera of the class in which the image is thrown upon a focusing plate and may be viewed through an observation aperture.

The invention comprises various novel features of construction by which compactness is insured, an accurate working is obtained and the manipulation of the camera is facilitated, all as more fully pointed out in the specification and appended claims.

In the accompanying drawing: Figure 1 is a vertical longitudinal section with parts broken away of a camera embodying my invention; Fig. 2 a vertical cross section through the left hand side thereof; Fig. 3 a perspective view of the focusing plate and bellows-lining; Fig. 4 a side elevation partly in section of the camera; Fig. 5 a plan of the lens bed and Fig. 6 a cross section thereof.

The box 10 of the camera is provided with a lid 11 hinged thereto at 12. Within the back of the box there is arranged a bipartite focusing plate having a white surface and composed of an upper section 13, and a lower section 14. These sections are fast on shafts 15, 16 respectively which are journaled in cheeks or bearings 17, and are adapted to be turned in manner hereinafter described, so as to swing the sections into a substantially horizontal or open position. In order to operate shafts 15, 16 they are provided with pinions 18, 19, meshing into a rack 20. This rack is furnished with an abutment 21 engaged by a tappet 22, which is fulcrumed at 23 and is influenced by a spring 24. An adjustable member 25 of rack 20 is provided with a nose 26 engaged by a pawl 27, which is pivoted at 28 and connected to the upper end of a bar 29 the lower end of which is engaged by a hand lever 30. It will be seen that when this lever is swung forward, bar 29 will be raised to withdraw pawl 27 from nose 26, and thereby cause the spring influenced tappet 22, to force rack 20 downward by pressing upon abutment 21. This movement of the rack will cause an approximate quarter turn to be given to pinions 18, 19, whereby the plate sections 13, 14 are swung forward in the manner desired.

The image thrown upon the focusing surface by the objective may be observed through a foldable hood 31, which is attached at its upper end and above the bellows, to the front of box 10, as shown at 32. Into the rear fold of the bellows 33, extend upper and lower plates 34, 35, turning loosely on shafts 15, 16 respectively and constituting a collapsible lining or frame for the bellows. These plates are connected in such a manner that they will be folded conjointly with the bellows, whenever pressure is applied to the front of the latter. For this purpose each plate 34, 35, is composed of two leaves hingedly connected as at 36, 37. The two front leaves are connected to each other at each side by a bar 38 located outside of the bellows proper. To this bar are pivoted curved links 39 influenced by springs 40, and connected to the inner ends of braces 41, the outer ends of which are pivoted to the front leaves at 42. When the camera is closed, the lining plates 34, 35, are folded against the sections 13, 14, of the focusing plate respectively. When the bellows are drawn forward prior to exposure, the pull on bars 38, will cause the plates 34, 35 to become unfolded, and assume the inclined position shown in full lines Fig. 1, in which position they will be sustained by the braces 41 and spring influenced links 39. When the bellows are pushed backward, subsequent to exposure, the links 39, will draw the braces inward to again fold plates 34, 35 toward and against the focusing surface, as indicated by dotted lines in said figure. In order to permit the image thrown upon the focusing plate to be observed through the hood 31, when the upper lining plate 34 is swung forward, the latter is provided with a large fenestral opening 43, which opening likewise extends through the body of the bellows. While the image is being focused, the focusing plate is of course in an upright position or closed, while the lining plates are in an inclined position or opened, the upper apertured lining plate 34 projecting across the back of the hood 31. In this position the lower rear end of the hood may be hooked to said lining plate as at 44, so that in this way the hood is positively held in its distended position. After the image has been properly focused upon plate 13, 14 by means of the hood 31 and the corresponding opening 43 of the lining plate, the focusing plate is swung forward in manner previously described, so that in this way the upper section 13 of said plate, is swung against the lower face of lining plate 34, and thus closes the observation aperture 43 and consequently hood 31. It will thus be seen that this upper section of the focusing plate, besides serving its primary object of receiving the image, assumes the important additional function of shutting out the light, from the hood during exposure.

Back of focusing plate 13, 14, box 10, is provided with a sensitive plate holding chamber 45 which is controlled by a focal plate shutter 46 as usual. This shutter is wound on rollers 47, 48, the upper roller 47, carrying a ratchet wheel 49, which is engaged by a dog 50 pivoted at 50$^a$, and engaged by pawl 27. Thus when bar 29, is raised, to open the focusing plate, dog 50 is simultaneously withdrawn from wheel 49, so that the shutter is tripped in the usual manner, and the exposure is effected.

Inasmuch as the image is focused on a plate which is located a certain distance in advance of the sensitive plate, compensating means for this distance are provided. These means are so constituted, that by the opening of the focusing plate, the objective is automatically retracted, a distance equal to the distance between the focusing plate and the sensitive plate. As shown, there is pivoted to the lower end of bar 29, a bell crank 51, which is connected by rod 52, to one arm of a two arm lever 53 which is pivoted to box 10 at 54. The other arm of this lever is by a hinged strap 55 connected to the lens bed 56, which is slidable in guides 57 of box 10 and cover 11. If therefore lever 30 is swung forward, to effect the exposure, the lens bed is simultaneously retracted, so as to cause the lens to approach the sensitive plate for the desired distance.

When lever 30 is released, the lens bed is again forced forward by a spring 59.

The manipulation of the camera will be readily understood. The bellows are drawn out in the usual way, the focusing plate is swung into a vertical position by means of a knob 60, the shutter is rolled up by knob 61, the observation hood is hooked on to the upper lining plate 34, and the image is focused through said hood. The starting lever 30 is now manipulated to retract the lens bed, swing the focusing plate forward (thereby closing the observation aperture) and tripping the shutter.

I claim:

1. A photographic camera, provided with a focusing plate composed of an upper and a lower movable section, bellows, a collapsible frame extending into the rear end of said bellows, an observation opening formed in said frame and bellows, and means for folding the upper focusing plate section against said opening.

2. A photographic camera provided with a focusing plate composed of an upper and a lower movable section, bellows, a collapsible frame extending into the rear of the bellows, observation openings formed in said frame and bellows, a hood located exteriorly of the bellows and adapted to communicate with said openings, and means for folding the upper focusing plate section against said openings.

3. A photographic camera provided with a focusing plate composed of an upper and a lower movable section, a slidable lens bed, means for simultaneously opening the sections of the focusing plate and retracting the lens bed, an apertured bellows, a collapsible frame extending into said bellows and having an observation opening, said opening being adapted to be closed by the upper focusing plate section when in its open position.

4. A photographic camera provided with a focusing plate composed of an upper and a lower pivoted section, bellows, a collapsible frame extending into said bellows and composed of an upper and a lower jointed plate, the upper foldable plate being provided with an observation opening, and means for sustaining said plates in their open position.

5. A photographic camera provided with a focusing plate composed of an upper and a lower pivoted section, bellows, a collapsible frame extending into said bellows and composed of an upper and a lower jointed plate, bars connecting said plates, spring-influenced links pivoted to the bars, and braces connecting the links with the plates.

LOUIS BREUNIG.

Witnesses:
ARTHUR A. GOLDMAN,
ALLGOT BLOMQUIST.